Oct. 14, 1924.  
F. F. GRAY  
VALVE FOR FLUSH TANKS  
Filed Sept. 19, 1923

1,511,605

INVENTOR.  
Frances F. Gray  
BY  
Watson E. Coleman  
ATTORNEY.

Patented Oct. 14, 1924.

1,511,605

UNITED STATES PATENT OFFICE.

FRANCES F. GRAY, OF WEST FINLEY, PENNSYLVANIA.

VALVE FOR FLUSH TANKS.

Application filed September 19, 1923. Serial No. 663,645.

*To all whom it may concern:*

Be it known that I, FRANCES F. GRAY, a citizen of the United States, residing at West Finley, in the county of Washington and State of Pennsylvania, have invented certain new and useful Improvements in Valves for Flush Tanks, of which the following is a specification, reference being had to the accompanying drawings.

This invention relates to valves for flush tanks and has for an important object thereof the provision of a flush tank valve which is simple and durable in its construction and which is free from wearing parts which cannot be very readily replaced.

A further object of the invention is to provide a valve of this character having a wearing part consisting of an ordinary rubber band such as is purchasable at any notion store and which is removably attached to the valve.

These and other objects I attain by the construction shown in the accompanying drawings, wherein for the purpose of illustration is shown a preferred embodiment of my invention and wherein:—

Figure 1:
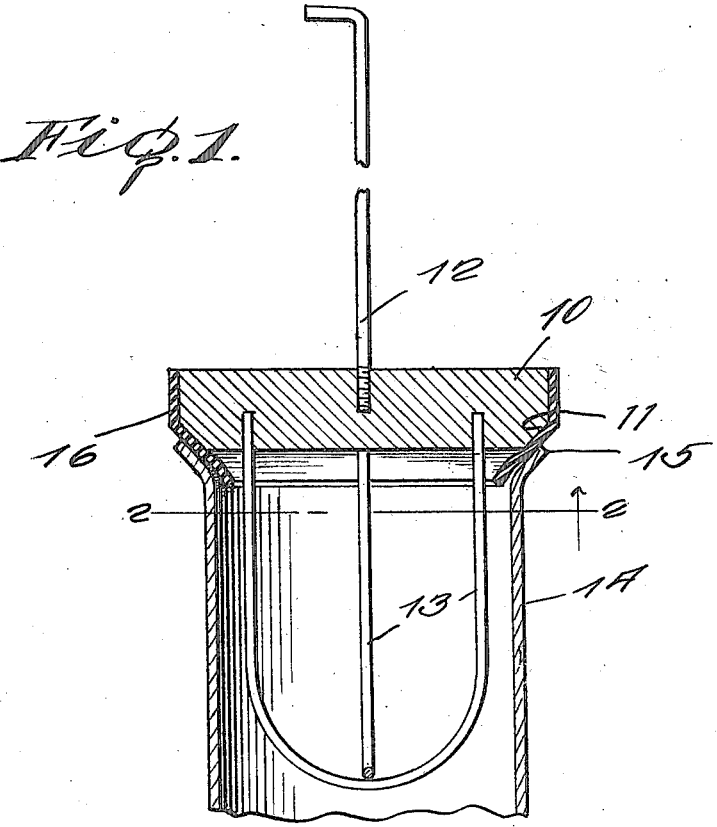
Figure 2:
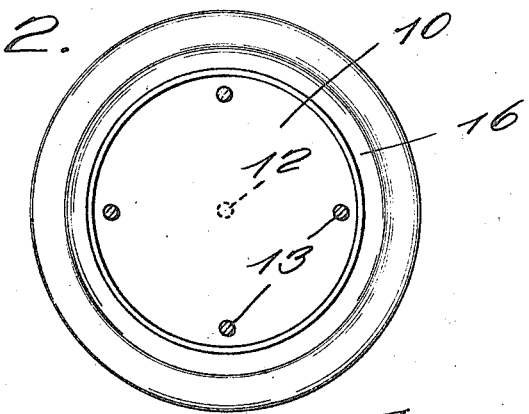

Figure 1 is a vertical sectional view taken through a valve constructed in accordance with my invention; and Figure 2 is a section on the line 2—2 of Figure 1.

Referring now more particularly to the drawings, the valve consists of a disk 10, the lower outside corner of which is tapered to provide a conical seat portion 11. With the upper surface of this disk is engaged the usual guide wire 12 which is threaded in the upper face of the disk. With the under surface of the disk are engaged the end portions of two U-shaped guide wires 13 which serve to guide the valve into position in a tube 14, the upper end of which is formed to provide a conical seat 15. Mounted upon the disk is a soft rubber band 16 of suitable width, which band is normally of less diameter than the diameter of the disk. The band is stretched to permit one edge portion thereof to engage about the periphery of the disk immediately above the edge of the tapered seat portion 11, with the result that the remainder of the band contracts and causes the band to assume a frusto-conical shape for coaction with the seat 15. The valve face thus provided is sufficiently yielding to permit proper engagement of the valve with the seat at all times and it will, of course, be obvious that upon failure of this seat surface the same can be replaced by an ordinary readily purchasable rubber band of the proper width. It will likewise be obvious that the formation of the under or seat surface of the valve disk is to a certain extent immaterial, the present construction being employed for the reason that it affords the most efficient backing for the removable seating surface afforded by the band 16. It will furthermore be obvious that the remaining details of the structure of the valve are capable of a certain range of change and modification without in any manner departing from the spirit of my invention and I accordingly do not limit myself to such specific structure as hereinbefore set forth except as hereinafter claimed.

I claim:—

A flush tank valve comprising a disk conical at its lower end, a member provided at its upper end with a valve seat for coaction with the conical portion of the disk, and a soft resilient normally straight walled band of less diameter than the disk having one edge portion thereof engaged with the disk above the conical portion thereof, the band projecting downwardly about the conical portion and contracting through its resiliency upon such conical portion to provide a yieldable seating face for the disk.

In testimony whereof I hereunto affix my signature.

FRANCES F. GRAY.